(12) United States Patent
Lin et al.

(10) Patent No.: US 9,961,369 B2
(45) Date of Patent: May 1, 2018

(54) METHOD AND APPARATUS OF DISPARITY VECTOR DERIVATION IN 3D VIDEO CODING

(71) Applicant: HFI Innovation Inc., Zhubei, Hsinchu County (TW)

(72) Inventors: Jian-Liang Lin, Yilan County (TW); Yi-Wen Chen, Taichung (TW); Yu-Wen Huang, Taipei (TW); Shaw-Min Lei, Hsinchu County (TW)

(73) Assignee: HFI Innovation Inc., Zhubei (TW)

( * ) Notice: Subject to any disclaimer, the term of this patent is extended or adjusted under 35 U.S.C. 154(b) by 0 days. days.

(21) Appl. No.: 14/408,956

(22) PCT Filed: Jun. 27, 2013

(86) PCT No.: PCT/CN2013/078172
§ 371 (c)(1),
(2) Date: Dec. 18, 2014

(87) PCT Pub. No.: WO2014/000664
PCT Pub. Date: Jan. 3, 2014

(65) Prior Publication Data
US 2015/0201214 A1    Jul. 16, 2015

Related U.S. Application Data

(60) Provisional application No. 61/665,707, filed on Jun. 28, 2012.

(51) Int. Cl.
*H04N 19/597* (2014.01)
*H04N 19/52* (2014.01)
(Continued)

(52) U.S. Cl.
CPC ......... *H04N 19/597* (2014.11); *H04N 19/105* (2014.11); *H04N 19/139* (2014.11);
(Continued)

(58) Field of Classification Search
CPC .................................................... H04N 19/597
(Continued)

(56) References Cited

U.S. PATENT DOCUMENTS 8,326,025 B2    12/2012  Boughorbel
8,823,821 B2 *   9/2014  Tian ...................... H04N 7/181
                                                    348/218.1
(Continued)

FOREIGN PATENT DOCUMENTS

CN       101512601 A       8/2009
CN       101690220 A       3/2010
(Continued)

OTHER PUBLICATIONS

View Synthesis for Multiview Video Compression; Martimian; 2006.*
(Continued)

*Primary Examiner* — Luis Perez Fuentes
(74) *Attorney, Agent, or Firm* — Oblon, McClelland, Maier & Neustadt, L.L.P.

(57) ABSTRACT

A method and apparatus for three-dimensional video encoding or decoding using the disparity vector derived from an associated depth block are disclosed. The method determines an associated depth block for a current texture block and derives a derived disparity vector based on a subset of depth samples of the associated depth block. The subset contains less depth samples than the associated depth block and the subset excludes a single-sample subset corresponding to a center sample of the associated depth block. The derived disparity vector can be used as an inter-view motion (disparity) vector predictor in Inter mode, an inter-view (disparity) candidate in Merge mode or Skip mode. The derived disparity vector can also be used to locate a reference block for inter-view motion prediction in Inter mode, (Continued)

inter-view candidate in Merge or Skip mode, inter-view motion prediction, inter-view disparity prediction, or inter-view residual prediction.

10 Claims, 6 Drawing Sheets

(51) Int. Cl.
   | | | |
   |---|---|---|
   | *H04N 19/157* | (2014.01) | |
   | *H04N 19/105* | (2014.01) | |
   | *H04N 19/139* | (2014.01) | |
   | *H04N 19/176* | (2014.01) | |
   | *H04N 19/513* | (2014.01) | |

(52) U.S. Cl.
   CPC ......... *H04N 19/157* (2014.11); *H04N 19/176* (2014.11); *H04N 19/513* (2014.11); *H04N 19/52* (2014.11)

(58) Field of Classification Search
   USPC ..................... 375/240, 240.16; 348/42, 43
   See application file for complete search history.

(56) References Cited

U.S. PATENT DOCUMENTS

| | | | |
|---|---|---|---|
| 8,854,486 B2* | 10/2014 | Tian ................ | H04N 19/008 348/218.1 |
| 8,964,844 B2 | 2/2015 | Lai et al. | |
| 9,060,165 B2 | 6/2015 | Liu et al. | |
| 9,253,486 B2* | 2/2016 | Tian ................ | H04N 13/0048 |
| 9,258,562 B2* | 2/2016 | Zhang .............. | H04N 19/597 |
| 9,432,684 B2* | 8/2016 | Lee ................. | H04N 19/44 |
| 2010/0158129 A1 | 6/2010 | Lai et al. | |
| 2011/0211638 A1 | 9/2011 | Sohn et al. | |
| 2012/0062756 A1 | 3/2012 | Tian et al. | |
| 2012/0269270 A1* | 10/2012 | Chen ............... | H04N 19/597 375/240.16 |
| 2013/0271567 A1* | 10/2013 | Lee ................. | H04N 13/0048 348/43 |
| 2014/0192154 A1* | 7/2014 | Jeong .............. | H04N 19/597 348/43 |
| 2014/0241434 A1* | 8/2014 | Lin ................. | H04N 19/597 375/240.16 |
| 2014/0341290 A1* | 11/2014 | Merkle ............ | H04N 19/52 375/240.16 |
| 2015/0201214 A1* | 7/2015 | Lin ................. | H04N 19/597 348/42 |

FOREIGN PATENT DOCUMENTS

| | | |
|---|---|---|
| CN | 101754042 A | 6/2010 |
| CN | 101785317 A | 7/2010 |
| WO | 2009020542 A1 | 2/2009 |

OTHER PUBLICATIONS

Working Draft 1—HEVC Coding Standard—3rd Meeting Guangzhou CN Oct. 7-15, 2010; JCTVC-C403.*
Overview of the Stereo and Multiview Video coding Extensions of the H.264-MPEG-4 AVC Standard; Apr. 2011.*
Overview of the Stereo and Multiview Video Coding Extensions of the H.264/MPEG-4 AVC Standard by Vetro/Wiegand/Sullivan; Apr. 2011].*
Using Harris Corner Points to Reduce the Complexity of local stereo image matching algorithm; Roszhowski; Set. 27-29, 2012.*
Overview of the Stereo and Multiview Video coding Extensions of the H.264-MPEG-4 AVC Standard; Vetro.*
Google search for NPL log.*
Using Harris Corner Points to Reduce the Complexity of local stereo image match algorithm; Roszhowski; Set. 27-29, 2012.*
Overview of the Stereo and Multiview Video coding Extensions of the H.264-MPEG-4 AVC Standard; Vetro, Wiegand, Sullivan; Apr. 2011.*
WP 3—3D-HEVC Test Model 1; Wegner; Jul. 2012.*
Schwarz, H., et al.; "Test Model under Consideration for HEVC based 3D video coding v3.0;" International Organisation for Standardisation; Apr. 2012; pp. 1-46.
Schwarz, H., et al.; "Description of 3D Video Coding Technology Proposal by Fraunhofer HHI;" International Organisation for Standardisation; Nov. 2011; pp. 1-46.
Schwarz, H., et al.; "3D-HEVC-CE3 results on inter-view motion parameter prediction by HHI;" International Organisation for Standardisation; Feb. 2012; pp. 1-10.
Schwarz, H., et al.; "Inter-view prediction of motion data in multiview video coding;" Picture Coding Symposium; May 2012; pp. 101-104.
Lin, J.L., et al.; "3D-CE5.a related—Simplification on the disparity vector derivation for AVC-based 3D video coding;" Joint Collaborative Team on 3D Video Coding Extension Development of ITU-RT SG16 WP 3 and ISO/IEC JTC 1/SC 29/WG 11; Jul. 2012; pp. 1-3.
Lin, J.L., et al.; "Simplification on the disparity vector derivation for HEVC-based 3D video coding;" Joint Collaborative Team on 3D Video Coding Extension Development of ITU-RT SG16 WP 3 and ISO/IEC JTC 1/SC 29/WG 11; Jul. 2012; pp. 1-3.
Gerhard Tech, et al., "31D-HEVC Test Model 1" 1st Meeting: Stockholm, SE, Jul. 16-20, 2012 (Joint Collaborative Team on 3D Video Coding Extension Development of ITU-T SG 16 WP 3 and ISO/IEC JTC 1/SC 29/WG 11), Document: JCT3VA10059_d0, 83 Pages.
Gerhard Tech, et al., "3D-HEVC Test Model 2" 2nd Meeting: Shanghai, CN, Oct. 13-19, 2012 (Joint Collaborative Team on 3D Video Coding Extension Development of ITU-T SG 16 WP 3 and ISO/IEC JTC 1/SC 29/WG 11), Document: JCT3V-B1005_d0,118 Pages.

* cited by examiner

METHOD AND APPARATUS OF DISPARITY VECTOR DERIVATION IN 3D VIDEO CODING

CROSS REFERENCE TO RELATED APPLICATIONS

The present invention claims priority to U.S. Provisional Patent Application Ser. No. 61/665,707, filed Jun. 28, 2012, entitled "Disparity vector derivation for multi-view video coding and 3D video coding". The U.S. Provisional Patent Application is hereby incorporated by reference in its entirety.

TECHNICAL FIELD

The present invention relates to three-dimensional video coding. In particular, the present invention relates to simplified disparity vector derivation for 3D video coding.

BACKGROUND

Three-dimensional (3D) television has been a technology trend in recent years that intends to bring viewers sensational viewing experience. Various technologies have been developed to enable 3D viewing. Among them, the multi-view video is a key technology for 3DTV application among others. The traditional video is a two-dimensional (2D) medium that only provides viewers a single view of a scene from the perspective of the camera. However, the multi-view video is capable of offering arbitrary viewpoints of dynamic scenes and provides viewers the sensation of realism.

The multi-view video is typically created by capturing a scene using multiple cameras simultaneously, where the multiple cameras are properly located so that each camera captures the scene from one viewpoint. Accordingly, the multiple cameras will capture multiple video sequences corresponding to multiple views. In order to provide more views, more cameras have been used to generate multi-view video with a large number of video sequences associated with the views. Accordingly, the multi-view video will require a large storage space to store and/or a high bandwidth to transmit. Therefore, multi-view video coding techniques have been developed in the field to reduce the required storage space or the transmission bandwidth.

A straightforward approach may be to simply apply conventional video coding techniques to each single-view video sequence independently and disregard any correlation among different views. Such coding system would be very inefficient. In order to improve efficiency of multi-view video coding, typical multi-view video coding exploits inter-view redundancy. Therefore, most 3D Video Coding (3DVC) systems take into account of the correlation of video data associated with multiple views and depth maps. The standard development body, the Joint Video Team of the ITU-T Video Coding Experts Group (VCEG) and the ISO/IEC Moving Picture Experts Group (MPEG), extended H.264/MPEG-4 AVC to multi-view video coding (MVC) for stereo and multi-view videos.

The MVC adopts both temporal and spatial predictions to improve compression efficiency. During the development of MVC, some macroblock-level coding tools are proposed, including illumination compensation, adaptive reference filtering, motion skip mode, and view synthesis prediction. These coding tools are proposed to exploit the redundancy between multiple views. Illumination compensation is intended for compensating the illumination variations between different views. Adaptive reference filtering is intended to reduce the variations due to focus mismatch among the cameras. Motion skip mode allows the motion vectors in the current view to be inferred from the other views. View synthesis prediction is applied to predict a picture of the current view from other views.

Figure 1:
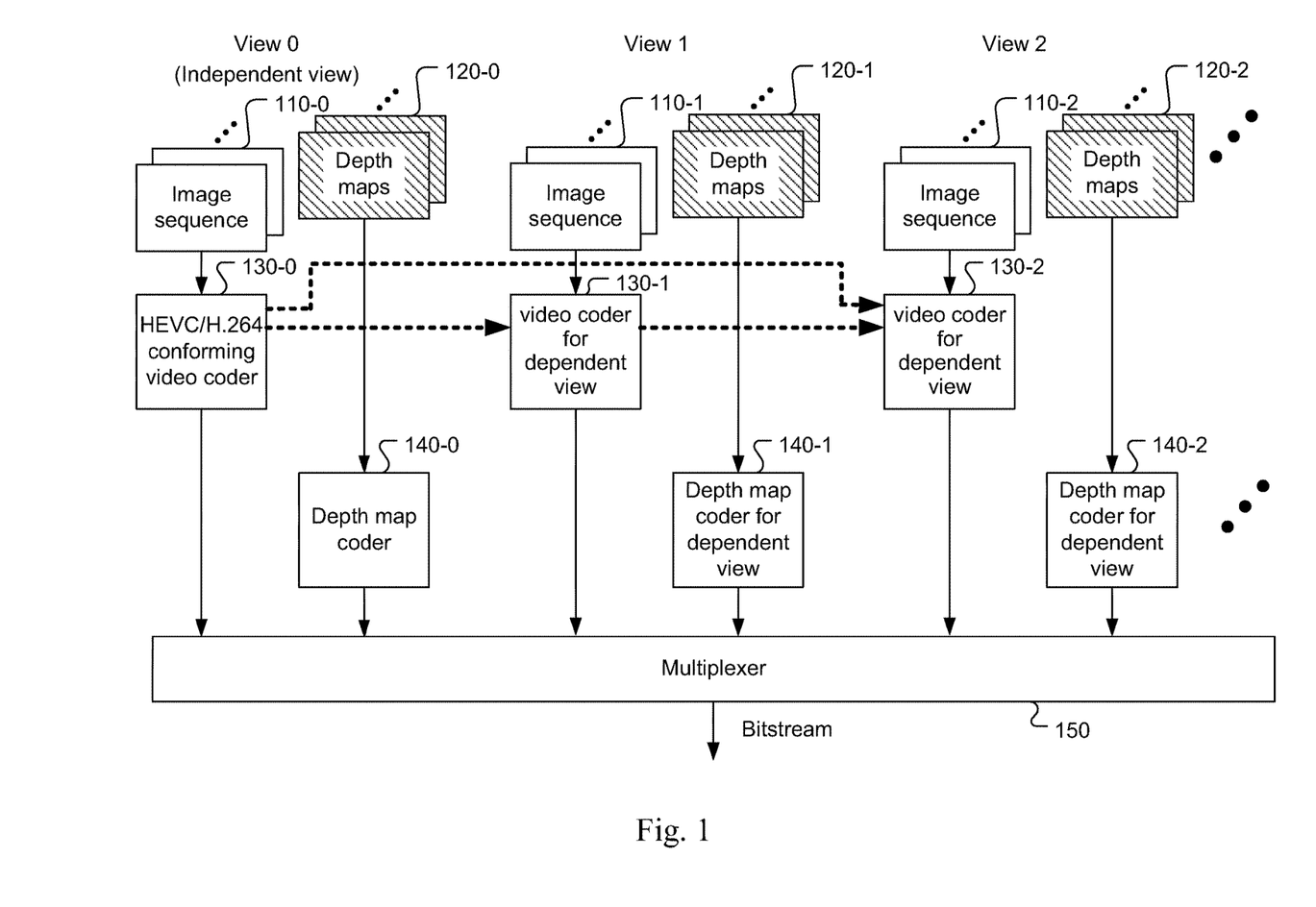
FIG. 1 illustrates an example of prediction structure for a three-dimensional video coding system.

In the MVC, however, the depth maps and camera parameters are not coded. In the recent standardization development of new generation 3D Video Coding (3DVC), the texture data, depth data, and camera parameters are all coded. For example, FIG. 1 illustrates generic prediction structure for 3D video coding, where a standard conforming video coder is used for the base-view video. The incoming 3D video data consists of images (110-0, 110-1, 110-2, . . . ) corresponding to multiple views. The images collected for each view form an image sequence for the corresponding view. Usually, the image sequence 110-0 corresponding to a base view (also called an independent view) is coded independently by a video coder 130-0 conforming to a video coding standard such as H.264/AVC or HEVC (High Efficiency Video Coding). The video coders (130-1, 130-2, . . . ) for image sequences associated with the dependent views (i.e., views 1, 2, . . . ) further utilize inter-view prediction in addition to temporal prediction. The inter-view predictions are indicated by the short-dashed lines in FIG. 1.

In order to support interactive applications, depth maps (120-0, 120-1, 120-2, . . . ) associated with a scene at respective views are also included in the video bitstream. In order to reduce data associated with the depth maps, the depth maps are compressed using depth map coder (140-0, 140-1, 140-2, . . . ) and the compressed depth map data is included in the bit stream as shown in FIG. 1. A multiplexer 150 is used to combine compressed data from image coders and depth map coders. The depth information can be used for synthesizing virtual views at selected intermediate viewpoints. An image corresponding to a selected view may be coded using inter-view prediction based on an image corresponding to another view. In this case, the image for the selected view is referred as dependent view.

Inter-view motion prediction and inter-view residual prediction are two major coding tools in addition to inter-view texture prediction (namely disparity compensated prediction, i.e., DCP) in 3DV-HTM. The 3DV-HTM is a platform for three-dimensional video coding based on HEVC Test Model. Inter-view motion prediction as well as inter-view residual prediction needs a disparity vector to locate a reference block for either motion prediction or residual prediction. For inter-view motion prediction, the disparity vector can also be directly used as a candidate disparity vector for DCP. In the current 3DV-HTM, the disparity vector is derived based on an estimated depth map of the view. There are two methods to generate the estimated depth maps.

Figure 2A:
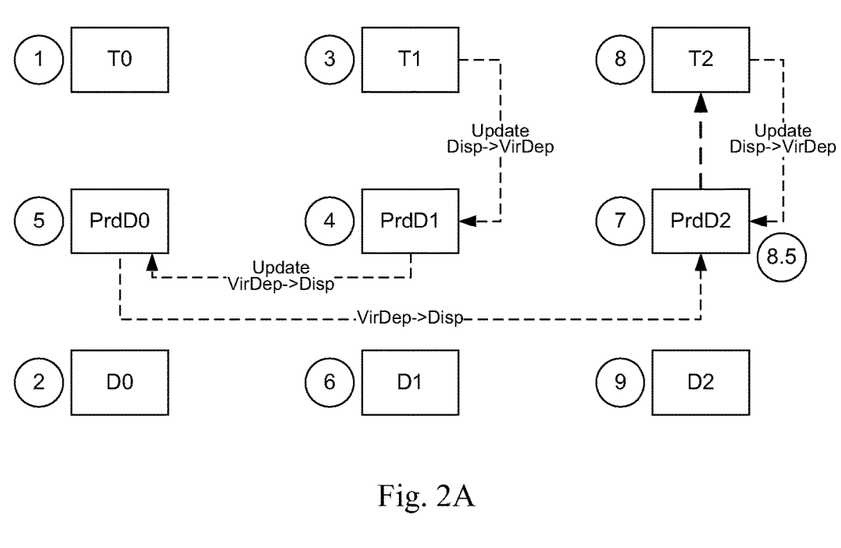
FIGS. 2A-2B illustrate examples of processing orders of texture pictures, depth maps and estimated depth maps in High Efficiency Video Coding (HEVC) based three-dimensional video coding.

FIG. 2A illustrates an example of the first method to generate estimated depth maps, where the method does not use coded depth maps. In FIG. 2A, a random access unit (i.e., the POC (Picture Order Count)=0) contains texture pictures (T0-T2) and depth maps (D0-D2) of three views. The circled numbers in FIG. 2A indicate the processing order. In steps 1 and 2, a texture picture of a base view (T0) is coded and the depth map of base view D0 is coded. In step 3, the texture picture of a first dependent view (T1) is coded without inter-view motion prediction or inter-view residual prediction. In step 4, an estimated depth map of the first dependent view (PrdD1) is generated by using coded disparity vectors of the texture picture of the first dependent view (T1). In step 5, an estimated depth map of the base view (PrdD0) is generated by warping the estimated depth map of the first dependent view (PrdD1). In steps 6 and 7, the depth map of the first dependent view (D1) is coded and an estimated depth map of a second dependent view (PrdD2) is generated by warping the estimated depth map of the base view (PrdD0). In step 8, the texture picture of the second dependent view (T2) is coded with inter-view motion prediction or inter-view residual prediction using the estimated depth map of the second dependent view (PrdD2) as indicated by the dashed arrow. In step 8.5, the depth map of the second dependent view (PrdD2) is updated by using coded disparity vectors of the texture picture of the second dependent view (T2). Since the depth map of the second dependent view (PrdD2) will not be referenced any more, step 8.5 is unnecessary in this example. In step 9, the depth map of the second dependent view (D2) is coded.

Figure 2B:
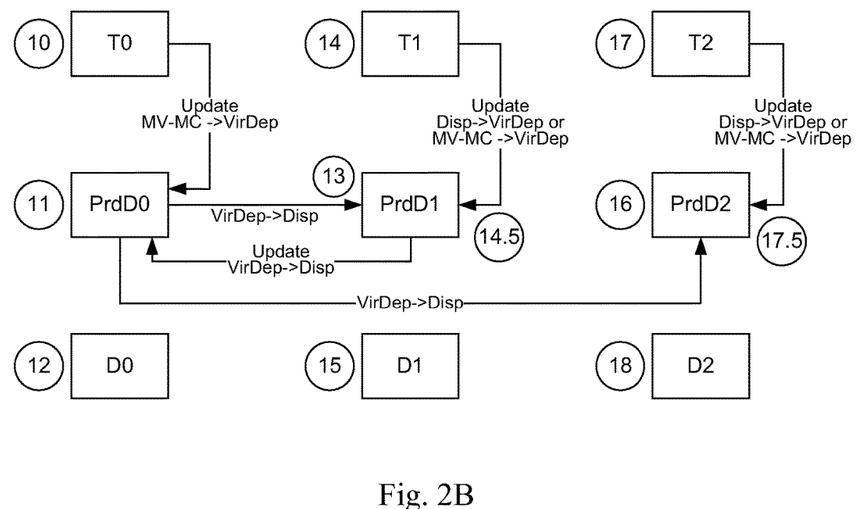

FIG. 2B illustrates an example of the first method to generate estimated depth maps for the case of POC not equal to 0. In step 10, the texture picture of the base view (T0) is coded. In step 11, an estimated depth map of the base view (PrdD0) is generated by using coded motion vectors of the texture picture of the base view and the estimated depth map of the base view of the previous access unit. In step 12, the depth map of the base view (D0) is coded. In step 13, an estimated depth map of a first dependent view (PrdD1) is generated by warping the estimated depth map of the base view (PrdD0). In step 14, the texture picture of the first dependent view (T1) is coded with inter-view motion prediction or/and inter-view residual prediction using the estimated depth map of the first dependent view (PrdD1). In step 14.5, the estimated depth map of the first dependent view (PrdD1) is updated by using coded disparity vectors of the texture picture of the first dependent view (T1). In step 14.7, the estimated depth map of the base view (PrdD0) is updated by warping the estimated depth map of the first dependent view (PrdD1). In step 15, the depth map of the first dependent view (D1) is coded. In step 16, an estimated depth map of a second dependent view (PrdD2) is generated by warping the estimated depth map of the base view (PrdD0). In step 17, a texture picture of the second dependent view (T2) is coded with inter-view motion prediction or/and inter-view residual prediction using the estimated depth map of the second dependent view (PrdD2). In step 17.5, the depth map of the second dependent view (PrdD2) is updated by using coded disparity vectors of the texture picture of the second dependent view (T2). Since the depth map of the second dependent view (PrdD2) will not be referenced any more, step 17.5 is unnecessary in this example. In step 18, the depth map of the second dependent view (D2) is coded.

The second method of generating estimated depth maps, which uses coded depth maps, is described as follows. Given an access unit of multiple views, regardless of whether the access unit is a random access unit or not, a texture picture of the base view (T0) and a depth map of the base view (D0) are first coded. An estimated depth map of a first dependent view (PrdD1) is then generated by warping the coded depth map of the base view (D0). A texture picture of the first dependent view (T1) is coded with inter-view motion prediction or/and inter-view residual prediction using the estimated depth map of the first dependent view (PrdD1). After the first dependent view (T1) is coded, the depth map of the first dependent view (D1) can be coded. The steps of generating an estimated depth map, coding a texture picture, and coding a depth map for a dependent view are repeated until all dependent views are processed.

After an estimated map is derived based on either the first or the second method, a disparity vector is derived for a current block associated with a depth block of the estimated depth map. According to current 3DV-HTM (version 0.3), a depth value of a center sample of the associated depth block is converted to a disparity vector. A reference block for inter-view motion prediction is determined according to the converted disparity vector. If the reference block is coded using motion compensated prediction, the associated motion parameters can be used as candidate motion parameters for the current block of the current view. The converted disparity vector can also be directly used as a candidate disparity vector for DCP for inter-view motion prediction. For inter-view residual prediction, a residual block indicated by the converted disparity vector is used for predicting residues of the current block.

Figure 3:
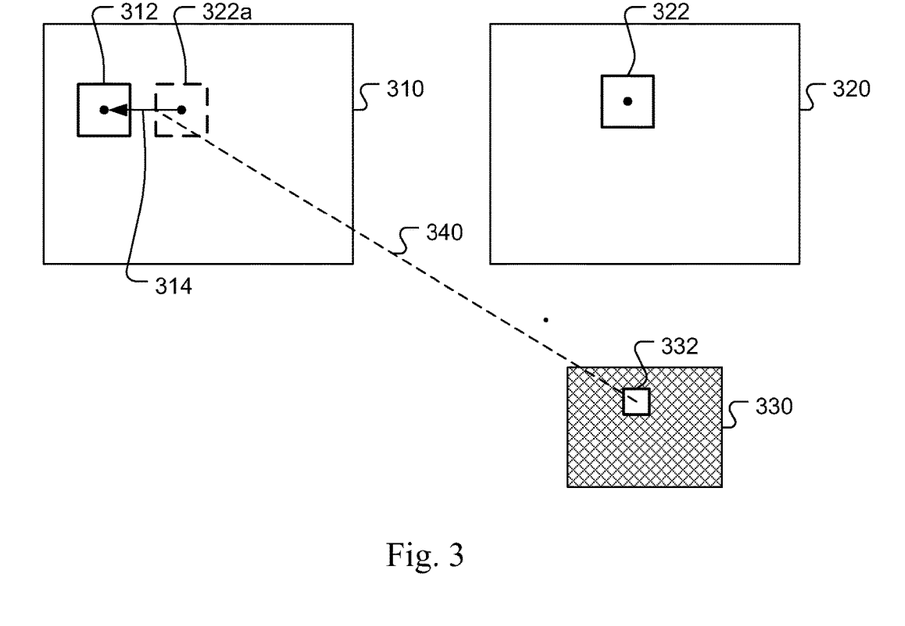
FIG. 3 illustrates an example of a disparity vector converted from the maximum depth value of an associated depth block for an inter-view motion vector predictor in the advanced motion vector prediction (AMVP) scheme for Inter mode, Merge mode, or Skip mode.

As mentioned earlier, the disparity vector is converted from the depth value of the center sample of the associated depth block in 3DV-HTM version 0.3. In 3DV-HTM version 3.1, the disparity vector is converted from the maximum depth value within the associated depth block and is used as an inter-view motion vector predictor in the advanced motion vector prediction (AMVP) scheme for Inter mode, as shown in FIG. 3. Picture 310 corresponds to a current picture in the reference view and picture 320 corresponds to a current picture in the current view. Block 322 represents a block to be processed in picture 320. The disparity vector (314) is derived based on the associated depth block (332) of the estimated depth map (330). As shown in FIG. 3, the disparity vector (314) points from a collocated block (322*a*) to a reference block (312) in reference picture 310. If there is a hole or an undefined sample (due to warping) in the associated depth block, the depth value of the left sample or the right sample is used. The disparity vector derived from the maximum depth value within the associated depth block is called the maximum disparity vector in this disclosure, where the maximum depth value corresponds to the nearest object. The inter-view motion vector predictor, which is indicated by the maximum disparity vector, is inserted at the first position in a candidate list of motion vector predictors in AMVP for Inter mode.

In 3DV-HTM-3.1, the process to derive the maximum disparity vector is rather computational intensive. For example, the associated depth block may correspond to a 16×16 block. To determine the maximum disparity vector may require comparing 256 depth values. It is desirable to simplify the disparity vector derivation.

SUMMARY

A method and apparatus for three-dimensional video encoding or decoding using the disparity vector derived from an associated depth block are disclosed. The method embodying the present invention determines an associated depth block for a current texture block and derives a derived disparity vector based on a subset of depth samples of the associated depth block. The subset contains less depth samples than the associated depth block and the subset excludes a single-sample subset corresponding to the center sample of the associated depth block. The derived disparity vector can be used as an inter-view motion (disparity) vector predictor in advanced motion vector prediction (AMVP) for Inter mode, an inter-view disparity candidate in Merge mode or/and Skip mode. The derived disparity vector can also be used to locate a reference block for inter-view motion vector prediction in AMVP for Inter mode, inter-view candidate in Merge or/and Skip mode, inter-view motion prediction, or/and inter-view residual prediction.

The derived disparity vector can be determined based on two end-samples of any row or column of the associated depth block, or the center sample and two corner samples of the associated depth block. The derived disparity vector may correspond to the maximum value, the average value, the median value, the most frequent occurrence, or a linear combination of depth values of the subset of the associated depth block, where the subset contains two or more depth samples. For example, the derived disparity vector corresponds to the maximum value of four corner samples of the associated depth block. The associated depth block can be determined based on a coded depth frame in a reference view. In one embodiment, an estimated disparity vector is determined based on the current texture frame and a reference texture frame, and the estimated disparity vector is used to determine the associated depth block from the coded depth frame in the reference view according to the estimated disparity vector. In another embodiment, the current texture block is divided into current texture sub-blocks, the associated depth block is divided into depth sub-blocks, and an individual disparity vector is derived from each depth sub-block for a corresponding current texture sub-block.

In another embodiment, a derived disparity vector is determined based on the maximum value of two or more depth samples of the associated depth block, and inter-view residual prediction is applied to the first data utilizing the derived disparity vector. In one embodiment, said two or more depth samples of the associated depth block correspond to all depth samples of the associated depth block.

DETAILED DESCRIPTION

Figure 4A:
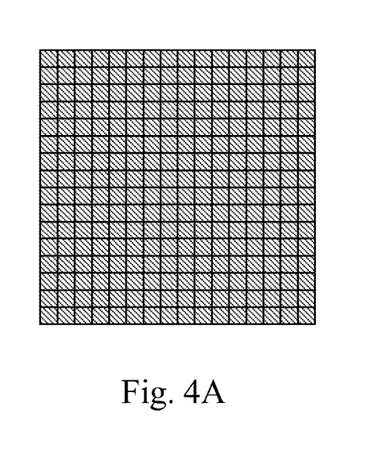
FIG. 4A illustrates an example of disparity vector derivation based on the maximum depth value of all depth samples in a 16×16 depth block.
Figure 4B:
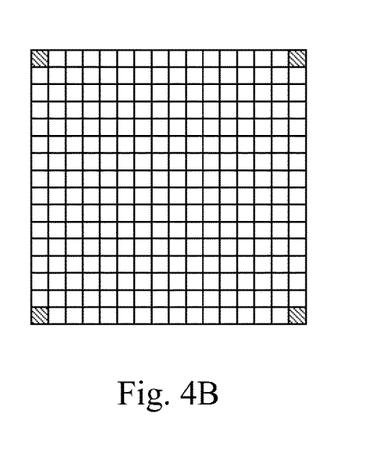
FIG. 4B illustrates an example of disparity vector derivation based on the maximum depth value of four corner depth samples in a 16×16 depth block.

As mentioned before, the maximum disparity vector derivation in 3DV-HTM may involve high computational complexity. FIG. 4A illustrates an example of an associated depth block consisting of 16×16 depth samples and the derivation of disparity vector will have to compare 256 depth values to determine the maximum depth value. Accordingly, simplification of the disparity vector derivation that searches the maximum depth value within a subset of the associated depth block is disclosed in the present invention. The subset contains less depth samples than the total samples in the associated depth block. The subset excludes the single-sample subset that contains the center sample of the associated depth block. For example, the subset may correspond to four corner samples of the associated depth block as shown in FIG. 4B. The disparity vector can be derived from the maximum depth value of four corner depth values. Therefore, the number of depth samples involved is reduced from 256 to 4. The number of comparisons required to derive the maximum depth value is reduced from 255 to 3. The performance of 3D video coding based on simplified disparity vector derivation is compared with the disparity vector derivation based on 3DV-HTM version 3.1 as shown in Table 1. The performance is based on BD-rate for 3D video data with three views (view 0 to view 2), where a negative value indicates an improvement over the anchor system (i.e., 3DV-HTM version 3.1). Various video data is used for comparison. As shown in Table 1, the 3D video coding system incorporating the simplified disparity vector derivation as described above achieves better performance (about 0.2% for view 1) over the disparity vector derivation based on maximum depth value of all depth samples in the associated depth block. The performance comparisons for "video 1" and "video 2" correspond to the BD-rate comparison for view-1 and view-2 video data respectively. The performance comparison for "video only" corresponds to the BD-rate comparison for video data of all views. The performance comparison for "synthesized only" is the BD-rate performance of the synthesized views at the decoder side. The performance comparison for "coded and synthesized" is the BD-rate performance of the synthesized views and the coded video data of all views.

TABLE 1

| | Video data | | | | |
|---|---|---|---|---|---|
| | video 1 | video 2 | video only | synthesized only | coded & synthesized |
| Balloons | −0.2% | 0.1% | 0.0% | −0.1% | −0.1% |
| Kendo | −0.1% | 0.0% | 0.0% | 0.0% | 0.0% |
| Newspapercc | −0.2% | 0.1% | 0.0% | 0.0% | 0.0% |
| GhostTownFly | −0.3% | −0.2% | −0.1% | −0.1% | −0.1% |
| PoznanHall2 | −0.4% | −0.2% | −0.1% | 0.0% | 0.0% |
| PoznanStreet | 0.0% | −0.1% | 0.0% | 0.0% | 0.0% |
| UndoDancer | −0.1% | 0.0% | 0.0% | 0.0% | 0.0% |
| 1024 × 768 | −0.1% | 0.1% | 0.0% | 0.0% | 0.0% |
| 1920 × 1088 | −0.2% | −0.1% | −0.1% | 0.0% | 0.0% |
| average | −0.2% | 0.0% | 0.0% | 0.0% | 0.0% |

Figure 5A:
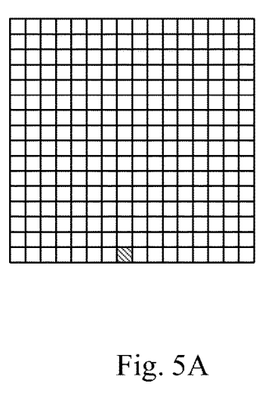
FIGS. 5A-5C illustrate examples of disparity vector derivation based on the maximum depth value of a center depth sample in the bottom row, two corner depth samples in the bottom row, or four corner depth samples and the center depth sample in a 16×16 depth block.

In addition to the depth values at four corners as shown in FIG. 4B, other locations of the depth block can be used for deriving the disparity value. In another example, the depth value of a center sample at the bottom row of the associated depth block is used for an inter-view candidate, as shown in FIG. 5A, instead of searching the maximum depth value of all depth samples in the associated depth block. The derived disparity vector may also be used for the inter-view motion vector in advanced motion vector prediction (AMVP) for Inter mode and the inter-view merging candidate in Merge and Skip mode. The Skip mode and Merge mode are well known techniques in video coding to reduce require data transmission by re-using motion information from a neighboring block. When the Skip mode is used, neither motion information nor residue data needs to be transmitted. When the Merge mode is use, there is no need to transmit the motion information.

Figure 5B:
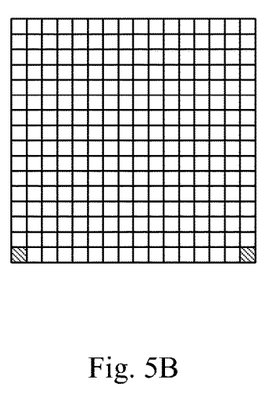

FIG. 5B illustrates another example of disparity vector derivation incorporating an embodiment of the present invention, where the disparity vector is derived from the maximum depth value of two end samples at the bottom row of the associated depth block. The derived disparity vector can be used for an inter-view motion vector predictor in advanced motion vector prediction (AMVP) for Inter mode and the inter-view merging candidate in Merge and Skip mode.

Figure 5C:
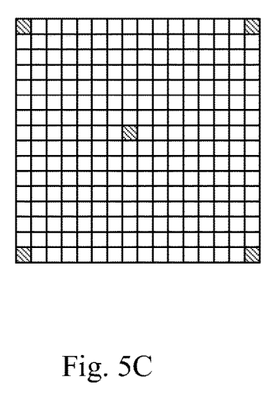

FIG. 5C illustrates another example of disparity vector derivation incorporating an embodiment of the present invention, where the disparity vector is derived from the maximum depth value of four corner samples and the center sample of the associated depth. The derived disparity vector can be used for an inter-view motion vector predictor in advanced motion vector prediction (AMVP) for Inter mode and the inter-view merging candidate in Merge and Skip mode.

The subsets illustrated in FIG. 4B and FIGS. 5A-5C are some examples. A person skilled in the art may select other subset to practice the present invention. For example, the subset may consist of two end samples of any row or column of the associated depth block, or the center sample and two corner samples of the associated depth block.

While the maximum depth value of the subset is used as the derived disparity vector, other criterion may also be used to derive the disparity vector. For example, the average value, the median value, the most frequent occurred value, or a linear combination of depth values of the subset of the associated depth block, where the subset contains two or more depth samples.

In another embodiment, a derived disparity vector is determined based on the maximum value of two or more depth samples of the associated depth block, and inter-view residual prediction is applied to the data utilizing the derived disparity vector to locate a reference residual block. In one embodiment, said two or more depth samples of the associated depth block correspond to all depth samples of the associated depth block.

Figure 6:
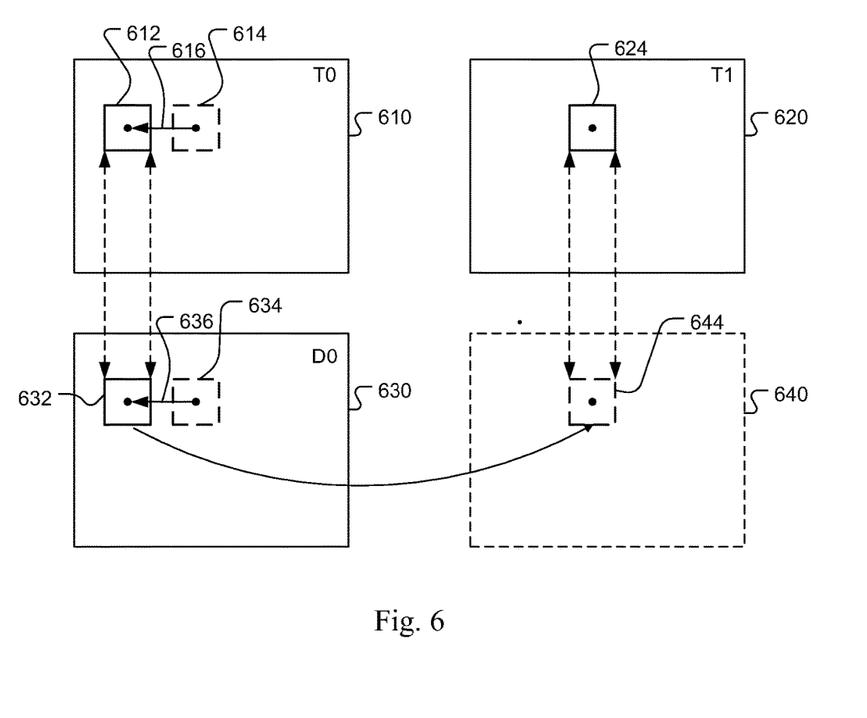
FIG. 6 illustrates an example of determination of the associated depth block based on an estimated disparity vector.

While FIG. 3 illustrates one example of determining the associated depth block, there are other ways to determine the associated depth block. For example, an estimated disparity vector (616) can be initially used to locate the corresponding block (612) in the coded texture view (610) as shown in FIG. 6. The estimated disparity vector is associated with block 614 (collocated with current block 624 of current texture view 620) and the corresponding block (612). The associated depth block (632) of the coded view is determined according to the estimated disparity vector (636) and the collocated block (634). The associated depth block (632) is then used as the virtual depth block (644) for the current block (624). Frame 630 corresponds to the depth frame associated with texture frame 610. Frame 640 corresponds to the virtual depth frame for current texture view 620. The disparity vector derivation technique as disclosed above can be applied to the associated depth block (632), i.e., the virtual depth block (644) to derive the disparity vector for the current block. For example, the maximum depth value of the depth samples at four corners of virtual block 644 can be used as the disparity vector for the current block. In another example, the maximum depth value of the depth samples at four corners and at the center of virtual block 644 can be used as the derived disparity vector for the current block.

Figure 7:
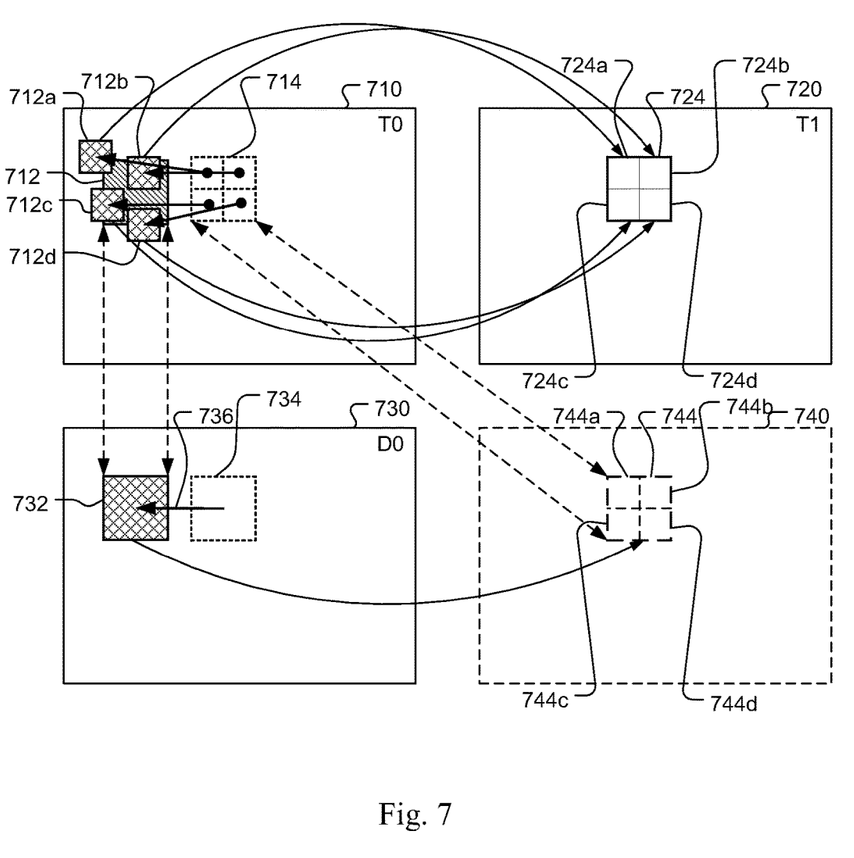
FIG. 7 illustrates an example of determination of the associated depth block based on an estimated disparity vector, where the associated depth block is divided into four depth sub-blocks.

FIG. 7 illustrates another example of determining the associated depth block. The derivation process is similar to the derivation process shown in FIG. 6. However, after the virtual depth block is determined, the virtual depth block is further divided into four depth sub-blocks. The current texture block is also divided into four texture sub-blocks. A disparity vector can be derived based on each virtual depth sub-block. In FIG. 7, frame 710 corresponds to a coded texture frame and frame 720 corresponds to a dependent-view texture frame to be coded. Frame 730 corresponds to the coded depth frame in the same view as texture frame 710. Block 724 is a block to be coded in frame 720. Blocks 714 and 734 are collocated blocks in the coded texture frame and the coded depth frame respectively. The estimated disparity vector (736) along with collocated block 734 is used to determine the associated depth block 732 in the coded depth frame. The associated depth block (732) is used as the virtual depth block (744) for the current block (724). The virtual depth block is then divided into virtual depth sub-blocks. The disparity vector derivation technique as disclosed above can be applied to each depth sub-block (744a-d) of the virtual depth block (744) to derive an individual disparity vector for the current texture sub-block (724a-d). For example, the maximum depth value of the depth samples at four corners of virtual sub-block 744a can be used as the derived disparity vector for the corresponding sub-block (724a). In another example, the maximum depth value of the depth samples at four corners and at the center of virtual sub-block 744a can be used as the derived disparity vector for the corresponding sub-block (724a). The maximum disparity vectors derived for texture sub-blocks can be used to locate the corresponding reference sub-blocks (712a-d) for inter-view motion prediction or inter-view residue prediction for the current sub-blocks.

Figure 8:
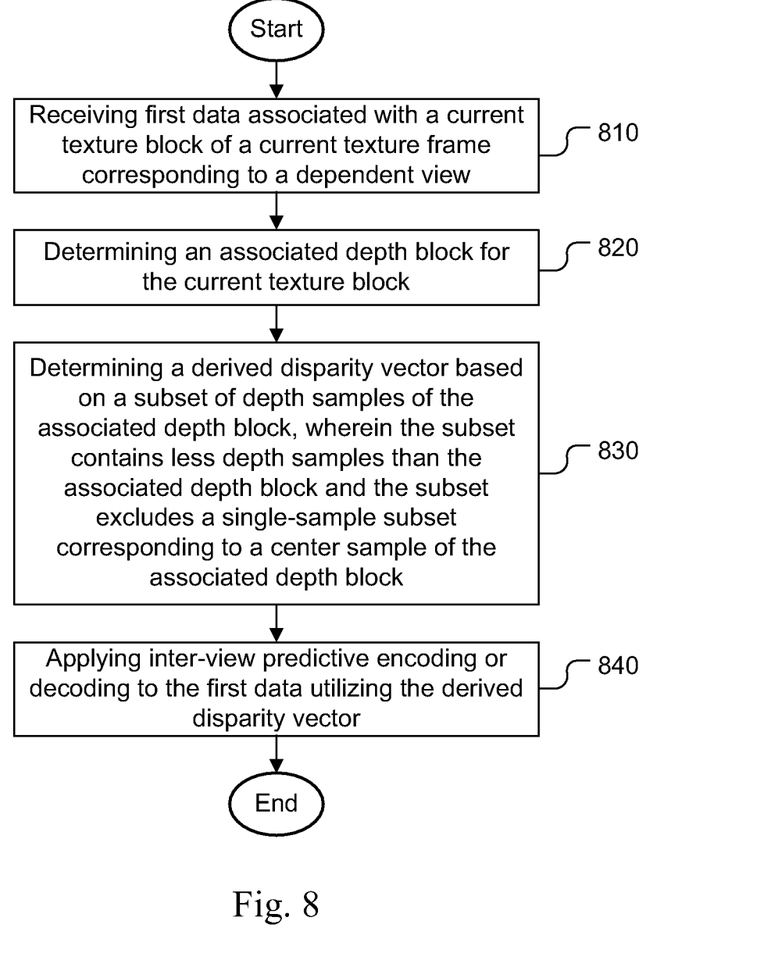
FIG. 8 illustrates an exemplary flowchart of a three-dimensional coding system incorporating the disparity vector derivation according to an embodiment of the present invention.

FIG. 8 illustrates an exemplary flowchart of a three-dimensional encoding or decoding system incorporating the disparity vector derivation according to an embodiment of the present invention. The system receives first data associated with a current texture block of a current texture frame corresponding to a dependent view as shown in step 810. For encoding, the first data associated with a current texture block corresponds to original pixel data to be coded. In the case of inter-view residual prediction, the first data associated with the current texture block may correspond to residue pixel data to be inter-view predicted. In the latter case, the residue pixel data is further predicted using inter-view prediction to generate inter-view predicted residues of residue pixel data. Accordingly, the inter-view residue data in this disclosure may correspond to inter-view residue data resulted by applying inter-view prediction on original pixel data or on residue pixel data. For decoding, the first data corresponds to the inter-view residue data to be used to reconstruct the original pixel data or residue pixel data for the current texture block. The first data may be retrieved from storage such as a computer memory, buffer (RAM or DRAM) or other media. The first data may also be received from a processor such as a controller, a central processing unit, a digital signal processor or electronic circuits that produce the first data. An associated depth block for the current texture block is determined as shown in step 820. A derived disparity vector is then determined based on a subset of depth samples of the associated depth block in step 830, wherein the subset contains less depth samples than the associated depth block and the subset excludes a single-sample subset corresponding to a center sample of the associated depth block. Inter-view predictive encoding or decoding is then applied to the first data utilizing the derived disparity vector as shown in step 840.

The flowchart shown above is intended to illustrate an example of inter-view prediction based on the disparity vector derived from an associated depth block. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for processing three-dimensional or multi-view video, the method comprising:
receiving pixel data associated with a current texture block of a current texture frame corresponding to a dependent view;
determining a depth block for the current texture block based on a coded depth frame in a reference view; and
determining a derived disparity vector for a partition of the current texture block based on a subset of depth samples of a partition of the depth block,
wherein the derived disparity vector corresponds to a maximum value of four corner samples of the depth block, and
wherein the partition of the current texture block corresponds to the partition of the depth block,
the subset contains less depth samples than the partition of the depth block and
the subset excludes a single-sample subset corresponding to a center sample of the partition of the depth block
such that inter-view motion predictive encoding or decoding is applied to the pixel data utilizing the derived disparity vector.

2. The method of claim 1, wherein the derived disparity vector is used as an inter-view motion/disparity vector predictor in Inter mode, an inter-view motion/disparity candidate in Merge mode or Skip mode, or inter-view disparity prediction.

3. The method of claim 1, wherein the derived disparity vector is used to locate a reference block for inter-view motion vector prediction in Inter mode, inter-view candidate in Merge mode or Skip mode, inter-view motion prediction, or inter-view residual prediction.

4. The method of claim 1, wherein the derived disparity vector is determined based on a center sample or two corner samples in a bottom row of the depth block, four corner samples of the depth block, or said four corner samples and the center sample of the depth block.

5. The method of claim 1, wherein the derived disparity vector is determined based on two end samples of any row or column of the depth block, or the center sample and two corner samples of the depth block.

6. The method of claim 1, wherein an estimated disparity vector is determined based on the current texture frame and a reference texture frame, and the estimated disparity vector is used to determine from the coded depth frame in the reference view according to the estimated disparity vector.

7. The method of claim 6, wherein the current texture block is divided into current texture sub-blocks, the depth block is divided into depth sub-blocks, and an individual disparity vector is derived from each depth sub-block for a corresponding current texture sub-block.

8. A method for processing three-dimensional or multi-view video, the method comprising:
receiving pixel data associated with a current texture block of a current texture frame corresponding to a dependent view;
determining a depth block for the current texture block based on a coded depth frame in a reference view; and
determining a derived disparity vector for a partition of the current texture block based on a maximum value of two or more depth samples of a partition of the depth block such that interview residual prediction is applied to the pixel data utilizing the derived disparity vector,
wherein the partition of the current texture block corresponds to the partition of the depth block, and
wherein the derived disparity vector corresponds to a maximum value of four corner samples of the depth block.

9. The method of claim 8, wherein said two or more depth samples of the depth block correspond to all depth samples of the depth block.

10. An apparatus comprising:
at least one circuit configured for:
receiving pixel data associated with a current texture block of a current texture frame corresponding to a dependent view;
determining a depth block for the current texture block based on a coded depth frame in a reference view; and
determining a derived disparity vector for a partition of the current texture block based on a subset of depth samples of a partition of the depth block,
wherein the derived disparity vector corresponds to a maximum value of four corner samples of the depth block, and
wherein the partition of the current texture block corresponds to the partition of the depth block,
the subset contains less depth samples than the partition of the depth block and
the subset excludes a single-sample subset corresponding to a center sample of the partition of the depth block
such that inter-view motion predictive encoding or decoding is applied to the pixel data utilizing the derived disparity vector.

\* \* \* \* \*